United States Patent [15] 3,691,090
Kitajima et al. [45] Sept. 12, 1972

[54] ENCAPSULATION METHOD
[72] Inventors: Masao Kitajima, Saitama; Tsutomu Yamaguchi, Saitama; Asaji Kondo, Saitama; Noriynki Muroya, Shizuoka, all of Japan
[73] Assignee: Fuji Photo Film Co., Ltd., Kanagawa, and Toyo Jozo Co., Ltd., Shizuoka, all of Japan
[22] Filed: Jan. 13, 1970
[21] Appl. No.: 2,618

[30] Foreign Application Priority Data
    Jan. 16, 1969    Japan ........................ 44/3042
    Jan. 17, 1969    Japan ........................ 44/3260

[52] U.S. Cl. ............... 252/316, 8/79, 106/308 Q, 117/100 A, 117/100 B, 252/188, 264/4, 424/32, 424/33, 424/35, 424/94
[51] Int. Cl. ............................ B01j 13/02, B44d 1/02
[58] Field of Search ....... 252/316; 117/100 A; 264/4; 424/33, 35

[56] References Cited
UNITED STATES PATENTS 2,800,458   7/1957    Green ........................ 252/316
3,016,308   1/1962    Macaulay ............... 252/316 X
3,173,878   3/1965    Reyes ........................ 252/316
3,371,015   2/1968    Sjogren et al. ............ 424/33 X
3,415,758   12/1968   Powell et al. ............... 252/316
3,523,906   8/1970    Vrancken et al. .......... 252/316

Primary Examiner—Richard D. Lovering
Attorney—Sughrue, Rothwell, Mion, Zinn and Macpeak

[57] ABSTRACT

A process for the preparation of capsules containing a core material, comprising dispersing the core material in a solution of an organic solvent and an encapsulating material, dispersing the dispersion in an aqueous inorganic salt solution and then removing the organic solvent, is disclosed.

28 Claims, 2 Drawing Figures

INVENTORS
MASAO KITAJIMA
ASAJI KONDO
TSUTOMU YAMAGUCHI
NORIYUKI MUROYA

BY Sughrue, Rothwell, Mion, Zinn & Macpeak

ATTORNEYS

ENCAPSULATION METHOD

BACKGROUND OF THE INVENTION

1. Field of the Invention

The present invention relates to a method for encapsulating various materials, and more particularly to a method of preparing capsules composed of a core material covered by a capsular forming material (hereinafter referred to as "encapsulating material").

2. Prior Art

There has hitherto been proposed the encapsulation of aspirin by ethyl cellulose, as disclosed in U.S. Pat. No. 3,341,416, in which, however, the composition composed of aspirin, ethyl cellulose and cyclohexane must be heated to about 80° C. Further, in this situation, a core material encapsulated in a capsule and an encapsulating material are specified as aspirin and ethyl cellulose, respectively.

It has been desired in the medical field to granulate an enzyme and to apply to the enzyme an enteric coating. However, since an enzyme is generally water soluble and unstable to the changes of pH and to heat, it has been difficult to prepare a tablet of the enzyme by a conventional pan coating process or the so-called Wurster process.

An object of the present invention is to provide a method for preparing capsules, in which various materials can be employed as core materials and various encapsulating materials can be used.

Another object of the present invention is to provide a method for preparing capsules without the necessity of the use of high temperatures.

Still another object of the present invention is to provide a method for preparing enteric capsules containing an enzyme.

DESCRIPTION OF THE INVENTION

The process of this invention comprises dispersing the core material in a solution of an encapsulating material dissolved in an organic solvent, adding the resulting dispersion to an aqueous inorganic salt solution in which the dispersion is suspended as oily drops having a desirable diameter, and thereafter evaporating away the organic solvent.

BRIEF DESCRIPTION OF THE DRAWINGS

Embodiments of capsules prepared by the method of the present invention are illustrated in the accompanying drawings.

DETAILED DESCRIPTION OF THE INVENTION

Figure 1:
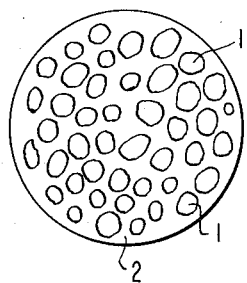
FIG. 1 shows an enlarged schematic cross-sectional view of a capsule composed of a plurality of particles 1 of a core material encapsulated in an encapsulating material 2.

The principle of the method of this invention is in the utilization of not only an organic solvent having a low polarity but also an organic solvent having a high polarity which is miscible with water and causes phase separation when it is mixed with an aqueous inorganic salt solution and in the utilization of drops of a solution of a polymer in an organic solvent suspended in an aqueous inorganic salt solution without being mixed therewith maintain their shape during evaporating the organic solvent through an aqueous phase when the system is maintained at a slightly reduced pressure or at elevated temperature.

The core material to be encapsulated by the method of the present invention can be selected from a wide range of materials. For example, it can be a hydrophilic material or an aqueous solution thereof and a hydrophobic material or a solution thereof. There are, for example, illustrated agricultural chemicals, foods, perfumes, catalysts, adhesives, curing agents, oxidizing agents, dyes, plasticizers, enzymes, and medicines.

Any polymers which are soluble in organic solvents can be employed, as the encapsulating material used in the present invention.

Examples of encapsulating materials are ethyl cellulose, nitrocellulose, cellulose acetate phthalate, shellac, polyacrylic acid, polymethacrylic acid, polyvinyl chloride, polyvinyl butyral, polyvinyl acetate, vinylic copolymers, polystyrene, polycarbonate, polymethyl methacrylate, a maleic anhydride copolymer, an alkyd resin, polybasic acid ester of cellulose, and the like.

Of the above recited encapsulating materials, polyhydric acid ester of cellulose, polyacrylic acid, polymethacrylic acid, a copolymer of maleic anhydride and vinyl monomer and shellac are especially preferred for the preparation of enteric capsules.

Any organic solvents of from a high polarity to a low polarity can be employed in combination with suitable polymers. The encapsulation temperature can be selected in a range of from a temperature lower than room temperature to a temperature near the boiling point of the aqueous inorganic salt solution used in the process of this invention. They are generally selected from compounds having a boiling point of lower than about 100° C. and incapable of modifying or dissolving the core materials.

Suitable organic solvents for the above-described encapsulating materials are alcohols such as ethanol, propanol, iso-propanol and butanol; ketones such as acetone and methyl ethyl ketone; ethers such as dioxane and tetrahydrofuran; esters such as ethyl acetate; and hydrocarbons such as pentane, hexane, cyclohexane, chloroform, methylene chloride, benzene and nitropentane.

In preparing enteric capsules containing an enzyme, it is desirable to use ketones such as acetone, alcohols such as ethanol or isopropanol, esters such as ethyl acetate and hydrocarbons such as benzene or hexane, which are capable of precipitating enzymes in an aqueous solution.

The inorganic salt used in the process can have a high solubility in water. A neutral salt, a salt of a weak acid or a salt of a weak base can be utilized as long as it is inert to the core material. Suitable salts are sulfates, nitrates, chlorides or phosphates of ammonia, alkali metals or alkali earth metals.

Specific examples of the easily soluble inorganic salts which can be used in the present invention are sodium chloride, potassium chloride, ammonium chloride, calcium chloride, potassium sulfate, sodium sulfate, ammonium sulfate, potassium nitrate, sodium nitrate, ammonium nitrate, calcium nitrate, sodium phosphate, and the like.

The concentration of the encapsulating material in the organic solvent solution is to the extent that the organic solvent solution can be dispersed in the aqueous inorganic salt solution in droplet form, and, in general, it is from 5 to 20 weight percent. Although it can be lower than 5 weight percent, the efficiency of the process is poor because large amounts of the solvent must be evaporated. And, although the concentration can be higher that 20 weight percent, the dispersing droplets are not formed because the viscosity of the solution is increased with an increase of the concentration.

The amount of core material used ranges preferably from 5 to 500 parts by weight based on 100 parts by weight of the encapsulating material.

The amount of the aqueous solution of the inorganic salt employed is a range of from about 2 times to about 100 times that of the dispersion of the polymer but preferably ranges from 5–20 times due to stirring efficiency and heating. Larger amounts of the aqueous inorganic solution can be used, if desired, but, where smaller amounts are used, the dispersed particles collide each other and aggregate, resulting in the formation of larger particles or masses.

It is possible to determine by experiment the range of the concentration of an aqueous inorganic salt solution at which the binary system of the organic solvent solution, containing the core material and encapsulating material, and an aqueous inorganic salt solution results in sufficient phase separation. However, it has been found that when almost all the inorganic salts are used at a concentration of from saturation to near saturation, phase separation results.

The encapsulation of the present invention can be understood by consideration of the following explanation. First of all, the powdered core material, or an aqueous solution of the core material, as well as the polymer desired as encapsulating material, are selected. Then, an organic solvent is selected as the solvent for the polymer to form an organic solvent solution of the polymer. The core material is dispersed in the polymer solution and the dispersion is suspended in a concentrated aqueous solution of an inorganic salt forming droplets. The dimensions of the droplets can be controlled by properly selecting the method of stirring and the method of adding the components. The organic solvent is evaporated away by only stirring the system, but it is advantageous to stir the system at such a reduced pressure and/or increased temperature that the droplets are not broken. The preferred reduced pressure is from 30 to 500 mm.Hg. and the preferred increased temperature is lower than the boiling point of the aqueous inorganic salt solution. If necessary, the operation can be conducted under reduced pressure and at a temperature lower than room temperature by 10° C. When the system is stirred in such condition, the organic solvent in the suspended droplet is evaporated off through the aqueous phase to deposit the polymer enwrapping the droplets of core material, whereby a substantially spherical capsule is obtained. By this procedure, capsules in spherical form having diameters of from 20 microns to 5 millimeters can be formed.

The materials to be preferably employed in the method of the present invention are described below.

In the above-mentioned materials, when the encapsulation method of the present invention is applied to an enzyme, which is unstable to heat and very soluble in water, a combination of cellulose acetate phthalate, acetone, and ammonium sulfate is used, the enteric encapsulation of the enzyme with cellulose acetate phthalate can be obtained with a yield of about 100 percent since the enzyme is insoluble in acetone and a concentrated aqueous salt solution, and further the acetone can be evaporated away even at a temperature lower than 35° C. Such an encapsulation can only be practiced by the method of the present invention.

Also, by applying the method of this invention to a combination of aspirin powders, ethylcellulose, tetrahydrofuran, and dipotassium hydrogen phosphate, the encapsulation of aspirin with ethylcellulose can be effected at a temperature lower than 40° C. without decomposing the aspirin, which is superior to the method disclosed in the specification of U.S. Pat. No. 3,341,416 in which encapsulation is conducted at about 80° C.

The merits of the method of the present invention are that encapsulation of enzymes or perfumes having low heat resistance is possible since the encapsulation of the present invention can be conducted at about room temperature, the encapsulation can be conducted regardless of whether the core material is hydrophilic or hydrophobic, and also the encapsulation can be conducted at an efficiency of about 100 percent.

According to the process of the present invention, enzyme-containing capsules capable of releasing the enzyme only at a neutral or alkaline state by applying an enteric coating onto the enzyme particles to protect the enzyme from its environment.

A feature of the method of the present invention is the possibility of encapsulating an enzyme at a temperature which will not denature the enzyme and without dissolving the enzyme, and without losing expensive enzyme.

The invention will further be explained by reference to the following examples.

EXAMPLE 1

Preparation of Pigment-Containing Capsules

In a solution of 0.5 g of polycarbonate in 20 g of dioxane was dispersed 2.1 g carbon black and the resulting dispersion was dispersed in a concentrated aqueous solution of 90 g of ammonium sulfate in 150 ml of water at 20° C with stirring the system vigorously. Thereafter, by heating the system to 50° C for 2 hours, the solvent was evaporated away and polycarbonate capsules containing carbon black having a uniform diameter of about 2 mm were formed, which were washed with water, recovered and dried.

EXAMPLE 2

Water-Soluble Dye-Containing Capsules

A powdered mixture of 0.5 g of Crystal Violet and 0.1 g of colloidal silica was dispersed in a solution of 1 g of polyvinyl chloride in 20 ml of tetrahydrofuran and the resultant dispersion was dispersed dropwise in 250 ml of an aqueous 35 percent ammonium sulfate solution. Thereafter, by heating the system to 40° C for 2 hours while stirring vigorously, the solvent was evaporated away and polyvinyl chloride capsules containing the dye having diameters of from 500 microns to 1 mm were obtained. In this procedure, the aqueous ammonium sulfate solution was not colored and could be used repeatedly. The yield of the capsules was almost quantitative.

EXAMPLE 3

Aspirin-Containing Capsules

A mixture of 2 g of aspirin powders of less than 500 microns in grain size and 2 g of corn starch was dispersed in 26 g of a benzene solution of 6.3 percent ethylcellulose (N–100; Trade Name, made by Hercules Powder Inc.) and the resultant dispersion was emulsified with vigorous stirring at 20° C in 230 g of an aqueous solution of 35 percent disodium hydrogen phosphate, the pH of which had been adjusted to 4 with the addition of a small amount of phosphoric acid. When the system was stirred at 500 mm. Hg for 2 hours at a temperature of 30° C, the benzene was evaporated away and aspirin-containing capsules having a diameter of about 1 mm. were recovered quantitatively.

EXAMPLE 4

Hemoglobin-Containing Capsules

In a polymer solution of 2 g of polystyrene in 20 g of benzene was dispersed by emulsification 4 g of an aqueous 25 percent hemoglobin solution. After emulsifying the above dispersion in a saturated aqueous sodium chloride solution with vigorous stirring, the system was stirred at 38° C for 1 hour, whereby benzene was evaporated away and polystyrene capsules containing hemoglobin were formed. The capsules had diameters of from 50 to 500 microns and the shape shown in FIG. 2 of the accompanying drawing. The capsules are useful for decomposing hydrogen peroxide.

EXAMPLE 5

Enzyme-Containing Capsules

Figure 2:
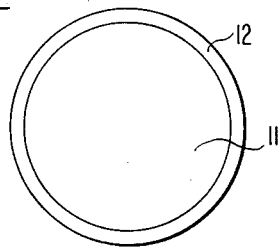
FIG. 2 shows an enlarged schematic cross-sectional view of another embodiment of the capsule composed of one drop of an aqueous solution of a core material 11 encapsulated by an encapsulating material 12.

In a polymer solution prepared by dissolving 2 g of cellulose acetate phthalate in 20 g of acetone was dispersed 1 g of an antiphlogistic enzyme (Pronase: Trade Name, made by Kaken Kagaku Co.) which was unstable to heat and acid and the dispersion was added to 160 g of an aqueous 35 percent ammonium sulfate solution. The system was then emulsified so that oil drops of about 1.5 to 2 mm. in diameter were suspended therein. By heating the emulsion to 30° C for 2 hours with stirring, the acetone was evaporated away through the aqueous solution and hard spherical enzyme-containing capsules of from 1 to 1.5 mm. in diameter were obtained. The capsules had the shape as shown in FIG. 2 of the accompanying drawing. The capsules were stable to the gastric fluid but were dissolved in intestinal fluid.

EXAMPLE 6

Enzyme-Containing Capsules

In a solution of 2 g of cellulose acetate phthalate in 20 g of acetone was dispersed 1 g of pancreatinum and the dispersion thus prepared was added to a concentrated aqueous solution of 60 g of ammonium sulfate in 100 g of water with stirring at 15° C to provide a state where oil drops of a few millimeters in size were suspended. When the system was heated to 30° C for 2 hours while stirring, the acetone was evaporated away to form rigid spherical particles of from 1.5 to 2 mm. in diameter. The capsule particles were recovered, washed with water, dried at 25° C and stored. The capsules contained more than 30 weight percent enzyme and a property of being dissolved in an intestinal liquid.

The properties of the enzyme-containing capsules of from 1.5 to 2 mm. in grain size prepared by Example 5 showing below and composed of a proteolytic enzyme encapsulated with cellulose acetate phthalate are as follows:

The yield for the enzyme-containing capsules was about 100 percent and almost no enzyme was lost during the preparation of capsules. When the capsules prepared were placed in an artificial gastric fluid or water overnight, no enzyme was dissolved out in the liquid. On the other hand, when the capsules were immersed in an artificial intestinal juice, the capsules and then the enzyme began to be dissolved after about 3 to 5 minutes. Also, as the enzyme was completely coated by the encapsulating material, the degradation of enzyme was quite less when the capsules are stored in air for a long period of time as compared with the case of placing the enzyme per se in air.

EXAMPLE 7

Enzyme-Containing Capsules

Employing the same procedure described in Example 6, an enzyme dispersion is prepared by adding a mixture of 0.5 g of pancreatinum and 0.5 g of silica powders or starch powders into a solution of 1 g of cellulose acetate phthalate in 10 ml. of acetone and the dispersion was added in 200 ml. of an aqueous 35 percent ammonium sulfate solution with stirring as in Example 1 to provide enzyme-containing capsules having a diameter of about 200 microns.

EXAMPLE 8

Enzyme-Containing Capsules

In a solution of 1.5 g of shellac in 20 g of isopropanol was dispersed 0.5 g of lipase. The resultant dispersion was dispersed in 250 g of an aqueous 30 percent calcium chloride solution with stirring and the system was heated to 35° C, for 90 minutes under 400 mm.Hg, whereby the isopropanol was evaporated and rigid spherical shellac capsules containing lipase having a diameter of 500 microns were obtained.

EXAMPLE 9

Enzyme-Containing Capsules

In a mixture of 10 g of isopropanol and 10 g of a 10 percent acetone solution of polyacrylic acid was dispersed 1 g of α-amylase and the dispersion was dispersed by emulsifying in 230 g of an aqueous 30 percent calcium chloride solution at 20° C with stirring. The diameter of the emulsified droplets of the dispersion was from 300 to 500 microns. When the system was heated to 35° C for 2 hours under 500 mm.Hg, capsules having a mean diameter of 300 microns were obtained.

Throughout Examples 6, 7, 8 and 9, the yields for the capsules were almost quantitative and the aqueous inorganic salt solutions could be used repeatedly after recovering them.

What is claimed is:

1. A method of preparing capsules containing a core material which comprises (1) dispersing the core material in a solution of an organic solvent miscible with water or partially miscible with water, selected from the group consisting of lower aliphatic alcohols, ketones, ethers, esters, and a hydrocarbon solvent selected from the group consisting of pentane, hexane, cyclohexane, chloroform, and nitropentane and a polymeric encapsulating material soluble in said organic solvent to form a dispersion, (2) dispersing dropwise the dispersion in an aqueous solution of an inorganic salt highly soluble in water and inert to the core material, and (3) then removing the organic solvent.

2. The method as claimed in claim 1 wherein said aqueous solution of the inorganic salt is at a concentration that it can be phase-separated from the dispersion.

3. The method as claimed in claim 1 wherein said core material is completely or partially water-soluble.

4. The method as claimed in claim 1 wherein said core material is a powder.

5. The method as claimed in claim 1 wherein said core material is a liquid.

6. The method as claimed in claim 1 wherein the boiling point of said organic solvent is lower than that of the aqueous inorganic salt solution.

7. The method as claimed in claim 1 wherein said organic solvent is removed by evaporation under reduced pressure.

8. The method as claimed in claim 7 wherein the reduced pressure ranges from 30 to 500 mm.Hg.

9. The method as claimed in claim 1 wherein said organic solvent is removed by evaporation with heating.

10. The method as claimed in claim 1 wherein said organic solvent is removed by evaporation under reduced pressure and with heating.

11. The method as claimed in claim 1 wherein said inorganic salt is a member selected from the group consisting of ammonium sulfate, calcium chloride, sodium phosphate and sodium chloride.

12. The method as claimed in claim 1 wherein said encapsulating material is an enteric polymer and said core material is an enzyme.

13. The method as claimed in claim 12 wherein said enteric polymer is cellulose acetate.

14. The method as claimed in claim 12 wherein said enteric polymer is polyacrylic acid.

15. The method as claimed in claim 12 wherein said enteric polymer is a copolymer containing a member selected from the group consisting of acrylic acid and maleic anhydride.

16. The method as claimed in claim 12 wherein said enteric polymer is cellulose acetophthalate.

17. The method as claimed in claim 12 wherein said enteric polymer is shellac.

18. The method as claimed in claim 1 wherein a concentration of said encapsulating material in the organic solvent solution ranges from 5 to 20 weight percent.

19. The method as claimed in claim 1 wherein the amount of said core material ranges from 5 to 500 parts by weight per 100 parts by weight of the encapsulating material.

20. The method as claimed in claim 1 wherein the amount of said aqueous inorganic salt solution ranges from 2 to 100 times that of the dispersion.

21. The method as claimed in claim 1 wherein the particle size of said capsule ranges from 20 microns to 5 millimeters.

22. The method of claim 1, wherein said encapsulating material is a member selected from the group consisting of ethyl cellulose, nitrocellulose, cellulose acetate phthalate, shellac, polyacrylic acid, polymethacrylic acid, polyvinyl chloride, polyvinyl butyral, polyvinyl acetate, vinylic copolymers, polystyrene, polycarbonate, polymethyl methacrylate, a maleic anhydride copolymer, an alkyd resin, and a polybasic acid ester of cellulose.

23. The method of claim 1, wherein said alcohol is a member selected from the group consisting of ethanol, propanol, iso-propanol, and butanol.

24. The method of claim 1, wherein said ketone is a member selected from the group consisting of acetone and methyl ethyl ketone.

25. The method of claim 1, wherein said ether is a member selected from the group consisting of dioxane and tetrahydrofuran.

26. The method of claim 1, wherein said ester is ethyl acetate.

27. The method of claim 1, wherein said organic solvent is a member selected from the group consisting of pentane, hexane, cyclohexane, chloroform, and nitropentane.

28. The method of claim 1, wherein said inorganic salt is a member selected from the group consisting of sodium chloride, potassium chloride, ammonium chloride, calcium chloride, potassium sulfate, sodium sulfate, ammonium sulfate, potassium nitrate, sodium nitrate, ammonium nitrate, calcium nitrate, and sodium phosphate.

* * * * *